Feb. 12, 1963 P. ISRAEL 3,077,360
CLOSURE DEVICE AND FASTENING MEANS THEREFOR
Filed Jan. 27, 1960 3 Sheets-Sheet 1
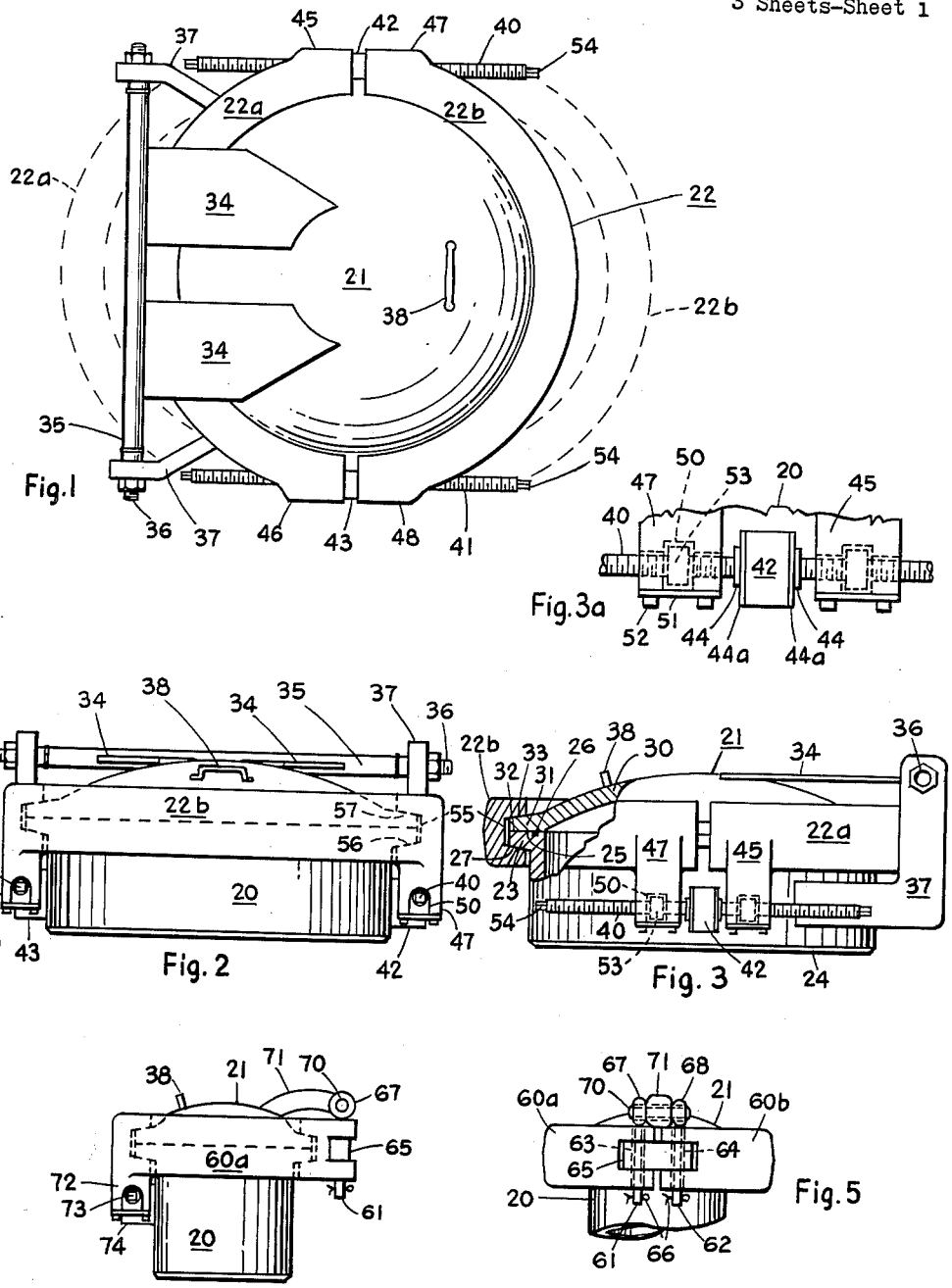
INVENTOR.
Philip Israel
BY Charles A. Campbell
ATTORNEY INVENTOR.
Philip Israel
BY
ATTORNEY Feb. 12, 1963 P. ISRAEL 3,077,360
CLOSURE DEVICE AND FASTENING MEANS THEREFOR
Filed Jan. 27, 1960 3 Sheets-Sheet 3

INVENTOR.
Philip Israel
BY Charles N. Campbell
ATTORNEY

United States Patent Office 3,077,360
Patented Feb. 12, 1963

3,077,360
CLOSURE DEVICE AND FASTENING
MEANS THEREFOR
Philip Israel, Bellaire, Tex., assignor to Chemetron Corporation, Chicago, Ill., a corporation of Delaware
Filed Jan. 27, 1960, Ser. No. 4,995
1 Claim. (Cl. 292—256.67)

The present invention relates to closure devices for tanks, vessels, pipe and various other forms of fluid enclosures, and more particularly to an improved closure device and fastening means therefor especially adapted and advantageous for applications where the associated enclosure is subjected to high internal fluid pressures, while also affording other important advantages including savings in space requirements, simple and light weight design and construction resulting in low cost and ease and convenience of handling and operation, and improved safeguards that minimize the possibility of injury to operating personnel and adjacent equipment.

In the fields of petroleum production and refining, gas transmission and distribution, and chemicals production and processing, as well as many other fields, a large number and variety of removable closure devices are employed. As examples of such devices, there may be cited closures for manholes and other access openings of heat exchangers, autoclaves and various forms of tanks, vessels, towers and other processing or storage equipment, and also closures for terminal or branch outlets of oil well "Christmas trees" and other openings in piping system components. In the majority of instances, the enclosures with which such devices are associated are subjected to elevated internal pressure, perhaps up to as much as several thousand pounds per square inch, so that assurance of tight seals between the closure devices and their associated enclosure openings is highly important. Yet, in many cases it also is required, or at least desirable, that the closures be capable of being manipulated easily, quickly and with minimum man power, including effecting the required tight seal upon closing and also insuring maximum safety to operating personnel when the seal is broken upon opening of the closure. Additional problems frequently are encountered due to space restrictions which impose limitations on the extent to which any parts may project from the enclosure with which the closure device is associated.

Among the kinds of closure devices which have been employed for applications such as referred to above are those which employ a segmental clamping ring, frequently referred to as a "yoke ring," the segments of which are provided with internal grooves to receive and clamp together abutting flanges on two parts to be joined. Such parts may comprise, for example, a tubular hub adapted to form a manhole or other access opening and having a radially projecting flange extending circumferentially around its open end, and a blind flange or dished-and-flanged cover adapted to close the open end of the hub. The grooves in the yoke segments are of generally V-shape so that their slanting or tapered walls cooperate with corresponding tapers provided on the back faces of the flanges of the parts to be joined so as to clamp the flanges together and effect a tight seal when the yoke ring is tightened. Various kinds of sealing elements, such as rubber O-rings or other forms of gaskets of suitable shape and material, depending upon pressure, temperature and other conditions to be encountered, commonly are employed between the flanges. The yoke rings usually are comprised of two arcuate segments, although more sometimes are employed. These segments are joined together to form the complete ring by means which include securing devices operable to permit contraction and expansion of the ring for tightening and loosening, respectively. In some cases, adjacent segment ends at one side of the ring are hinged while adjacent segment ends at the opposite side or sides are joined by securing devices such as referred to above. In perhaps the majority of cases, however, all of the adjacent ends of the ring segments are provided with securing devices capable of being individually tightened. Among the most common securing devices are those comprising some form of tension bolt, although other forms, such as toggle devices and straps, also have been employed.

In the cases of yoke rings as employed with closure devices of the kinds above described which heretofore have been available on the market, the securing devices for the yoke ring segments generally have been mounted on the outer peripheries of the segments, usually by means of projections or lugs extending radially outward from the rings. Although satisfactory for some applications, it has been found that such constructions have important disadvantages in other applications which perhaps constitute the majority of the potential uses for closure devices of the kind herein contemplated. Among these latter applications are those in which relatively high pressures and temperatures are encountered and, due to temperature limits of materials commonly employed for self-energizing gaskets, it is necessary to employ gaskets of heat resistant material which require high compressive loading in order to insure an effective high pressure seal. To obtain such loading, the yoke rings must exert high clamping forces, and with mounting lugs for the securing devices extending radially outward from the yoke segments as above described, it has been found that under these circumstances there may be produced such non-uniform loading of the yoke that there is danger of leakage within the permissible limits of loading on the securing devices. Also, localized galling of the contacting surfaces of the yoke groove and flanges or other damage to parts of the closure device may occur. An additional disadvantage of the outwardly projecting lugs, not limited to high pressure or high temperature applications, is that they may introduce installation problems in situations where space limitations are encountered.

A general objective of the present invention, therefore, is to provide improvements in closure devices and fastening means therefore of the kind hereinabove discussed, which will eliminate the disadvantages referred to as well as others encountered with closure devices of the kind heretofore available on the market.

A more specific objective is to provide improvements in construction of yoke rings adapted for use with such closure devices, which will afford improved distribution of load on the yoke ring parts and thereby a more uniform and adequate loading on the flanges of the parts to be joined and the associated gasket element without the necessity for resorting to oversizing or other undesirable modifications of structural elements of the closure devices or their fastening means.

Among the important features of the present invention by means of which the stated objectives are accomplished is the location of mounting lugs for the yoke ring securing devices on the sides of the yoke segments in a manner to greatly reduce, or even eliminate entirely, superimposed bending stresses such as occur with high clamping forces when the lugs project radially from the external periphery of the yoke segments.

For a more complete understanding of the above stated and other objectives as well as a detailed explanation of that which I consider to be novel and my present invention, reference is directed to the ensuing description and the claim appended thereto, taken in conjunction with the showings of exemplary embodiments in the accompanying drawings in which:

FIG. 1 is an end view of one form of closure device embodying the present invention and employing a hinged cover;

FIGS. 2 and 3 are side views of the device of FIG. 1, respectively taken at right angles to each other and showing certain details of the construction and arrangement of the hinge mechanism and the lugs and mounting bracket for one of the yoke bolts, FIG. 3 being partially in section to show certain details of the manner in which the cover is clamped in closed position, and FIG. 3a being an enlarged detail view of certain of the parts of FIG. 3;

FIG. 4 is a side view of another form of closure device embodying the present invention and in which the yoke segments are provided with a clamping bolt on only one side of the device, the ends of the segments on the other side being hingedly mounted;

FIG. 5 is a side view, taken at right angles to that of FIG. 4, showing details of the hinged mounting of the yoke segments;

Figure 6:
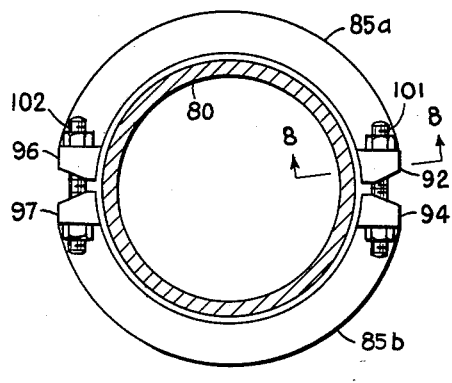
FIG. 6 is an end view, partially in section, showing an alternate form of yoke ring embodying the present invention, as employed for joining two flanged pipe elements.

FIGS. 9 through 14 (FIGS. 9, 10 and 11 being sectional views) are diagrammatic illustrations of different forms of yoke ring segments for purposes of explanation later herein of certain technical aspects of the present invention.

Referring first to the embodiment illustrated in FIGS. 1–3, it will be seen from the figures that the closure device therein illustrated comprises in the main a tubular mounting element or hub 20, a removable cover 21, and fastening means for clamping those two parts together, which fastening means comprises a segmental yoke ring 22. The hub 20 is of the general form of a pipe stub end having at one end (the upper end as viewed in the drawings) a tapered flange 23 and having at the other end a bevel 24 to provide for welding of the hub to another pipe section or to the rim of an opening in a fluid enclosure with which the closure device is to be associated. Flange 23 has a mating face 25 lying in a plane extending normal to the axis of the hub and provided with a groove for receiving a gasket 26. The back face 27 (i.e., the lower face as viewed in the drawings) of flange 23 is machined to provide a frusto-conical contact surface for purposes hereinafter described. Where temperature and pressure conditions permit, a gasket of the self-energizing type may be employed, such as a rubber O-ring as represented at 26. Where, however, the conditions to be encountered are such that a rubber O-ring gasket is not satisfactory, other suitable and well known forms of gaskets may be employed, such as a flat ring gasket (not shown) of asbestos or the like resting on the mating face 25 of flange 23.

Cover 21 in the illustrated embodiment has a dished portion 30 and a peripheral tapered flange 31 of unitary construction, although if desired, the cover may be made of ellipsoidal or other form of cap element with a separate flange element welded around the periphery thereof. Alternately, a flat plate, such as a so-called "blind flange," may be employed. The flange in each such case should have, as in the illustrated embodiment, a mating face 32 lying in a plane normal to the axis of the hub 20 for engagement with the mating face of flange 23, and a back face 33 machined to frusto-conical form for a purpose hereinafter explained. For ease and convenience of operation, it is desirable that cover 21 be hingedly mounted so that it may be swung to open position and supported in that position when the fastening means are released. In the exemplary embodiment illustrated in FIGS. 1–3, this is accomplished by means of hinge straps 34, 34 attached at one end to the cover and attached at the other end to a tubular bearing element 35 rotatably mounted on a hinge pin 36. This hinge pin in turn is supported by brackets 37, 37 mounted, as by welding, on the side of hub 20 as indicated in FIG. 3. For added convenience in operation, a handle 38 may be provided on the cover.

Yoke ring 22 is comprised of two semi-circular segments 22a and 22b connected together by securing or tightening devices comprising screw bolts 40 and 41. These bolts are supported in brackets 42 and 43 welded or otherwise suitably secured to opposite sides of hub 20. The midportions of bolts 40 and 41 are provided with bearing portions which are rotatably mounted, preferably with a suitable form of anti-friction means (not shown), in the brackets 42 and 43, respectively, and the bolts are restrained from axial, or longitudinal, movement relative to their supporting brackets by suitable means such as set-collars and associated washers as indicated at 44 and 44a, respectively, in FIG. 3a. For connection of the bolts with the yoke segments and operation of the yoke ring, bolt receiving lugs are provided on the yoke segments, two such lugs, 45 and 46, being formed respectively on opposite ends of yoke segment 22a and two lugs 47 and 48 being formed respectively on opposite ends of yoke segment 22b. The manner of connecting lugs 45 and 47 with bolt 40 and lugs 46 and 48 with bolt 41 is the same in each case, and is illustrated by the connection of lug 47 to bolt 40 as shown in FIGS. 3 and 3a. As will be seen from those figures, lug 47 is provided with a socket 50 opening in a downward direction (i.e., in a direction away from the main body of the associated yoke ring segment and generally parallel to the axis of the hub and yoke ring), as shown in the drawings, and closed at the bottom by means of a removable retainer plate 51 secured in place by means of screws 52. This socket accommodates a nut 53 threaded on bolt 40, which nut is adapted to seat sufficiently loosely in the socket to permit easy introduction of the nut into the socket when retainer plate 51 is removed but is restrained against movement relative to lug 47 in the direction of the longitudinal axis of bolt 40. Thus, axial movement of the nut on the bolt upon rotation of the latter will cause movement of lug 47 relative to fixed bracket 42 in the direction of the bolt axis. It is desirable, with closure devices of the kind herein illustrated, that the yoke ring segments be positively moved apart not only relative to each other but also relative to the flanges of the cover and hub upon loosening of the ring segments so as to effect complete release of the cover and insure against sticking or binding of either of the yoke segments to the flanges. This is accomplished in the embodiment illustrated in FIGS. 1–3 by providing right and left hand threads respectively on opposite ends of bolts 40 and 41. Thus, with the bolts restrained against axial movement by their fixed brackets 42 and 43 as previously described, rotation of the bolts in one direction will effect positive and equal movement apart of the yoke segments to their expanded positions, indicated in broken lines in FIG. 1, for release of the cover, and rotation of the bolts in the opposite direction will effect positive and equal movement together of the yoke segments for clampingly securing the cover. Bolts 40 and 41 are provided at opposite ends with heads 54 suitably formed for engagement with wrenches or other operating tools.

The clamping and sealing of cover 21 in closed position is accomplished by provision of inwardly facing, generally V-shaped grooves in the inner peripheries of the yoke ring segments 22a and 22b. The details of such grooves, of identical form in both segments, will be apparent from the showing of groove 55 in yoke segment 22b as illustrated in FIGS. 2 and 3. This groove has an outer wall or base portion of semi-cylindrical form from which there extend inwardly two oppositely flaring side walls, 56 and 57. These walls are machined to provide smooth frusto-conical surfaces which extend at the same angles with respect to the plane of the joint between hub 20 and cover 21 as do the back faces 27 and 33, respectively, of the hub flange 23 and the cover flange 31. Thus, when the yoke segments are drawn into clamping engagement with the flanges, the contact surfaces of the yoke segment grooves substantially coincide with the corresponding contact surfaces on the back faces of the flanges so as to provide for transfer of loading from the yoke ring segments to the flanges over a relatively wide area throughout the arcuate extent of the segments. This insures maximum efficiency and uniformity of loading of the flanges and the interposed gasket in the absence of distortion of the yoke segments such as referred to hereinafter. For maximum clamping action, the angle of the cooperating contact surfaces of the flanges and the yoke segment grooves with respect to the plane of the opening of the hub should be relatively small, i.e., substantially less than 45° and preferably in the order of 10° to 20°, in order that the major components of the clamping forces exerted by the yoke segments on the flanges will be in an axial direction. This also has the effect of reducing to a small value the radial components of force tending to cause outward movement of the yoke segments when the associated closure is under pressure.

Particular attention is directed to the fact that in accordance with one important aspect of the present invention, all of the yoke bolt lugs 45, 46, 47 and 48 extend to one side of their associated yoke segments in a direction parallel to the axis of the closure device and its yoke ring, rather than projecting radially outward as is commonly the case with similar closure devices heretofore available. The principles upon which this feature of the invention is based and certain important advantages resulting therefrom are explained in detail later herein. However, certain other advantages will be pointed out in the course of the immediately following explanation of the manner of operation of the embodiment thus far described.

From the foregoing description, it will be evident that when it is desired to open the closure device, bolts 40 and 41 are rotated in a direction to cause the yoke segments to move apart. As previously indicated, this will produce forceful disengagement of both segments from the cover and hub flanges, eliminating danger of sticking of either of the segments to the flanges, and will cause equal movement of the segments to their expanded positions indicated in FIG. 1. This disengagement may be accomplished easily and in a matter of only a few minutes, but it will take place sufficiently gradually to permit reduction in fluid pressure in the associated enclosure to a safe value before the cover is released by the yoke ring. This is in contrast to the action of some closure devices on the market which employ constructions such that the cover releasing action takes place in a manner that will permit the cover to fly open suddenly if the enclosure is under substantial fluid pressure, with resultant danger of injury to operating personnel and adjacent equipment. A further advantage of the closure device of FIGS. 1–3 and others of similar design, as compared with constructions such as referred to immediately above, is that yoke rings of the kind herein described provide an inherent safeguard against opening of the cover when the associated enclosure is under a potentially dangerous high pressure, in that under such circumstances the frictional resistance to relative movement between the cooperating contact surfaces of the yoke segments and flanges, due to the relatively small angle of those surfaces with respect to the plane of the hub opening, will prevent releasing action of the yoke ring, unless the operator exerts excessive effort, until the gasket seal is broken to relieve the enclosure pressure or that pressure is otherwise reduced.

When the yoke segments are in their expanded positions indicated by the broken lines in FIG. 1, cover 21 may be easily swung to completely open position, where it will be fully supported by the hinge brackets 37, 37 and associated hinge parts 34, 35 and 36. Thus there is avoided the necessity of employing the efforts of several operators, or the use of cranes or hoists which it may be inconvenient and expensive to furnish at isolated locations, as are required for manipulation and handling of the covers of certain other forms of closure devices in common use. The advantage of this feature of closure devices such as exemplified by the embodiment of FIGS. 1–3 will be particularly appreciated when it is recognized that such devices not uncommonly are furnished in sizes up to 42 inches in diameter and even considerably larger in some cases, so that their cover elements may attain considerable weight, as much as a half ton or more. A similar advantage arises from the fact that the yoke ring segments of the embodiment above referred to, which individually may have a weight approaching that of the cover element, also are fully supported, by their lugs and the brackets 42 and 43, when they are in their expanded positions. This is true even in those cases, which are quite common, where the plane of the closure opening extends vertically so that the end of the closure device appears in elevation as shown in FIG. 1. In such cases the yoke ring segments when in expanded positions are supported at both the top and bottom by reason of the fact that one side of each of the bolt receiving sockets in the yoke lugs, as represented by the socket 50 shown in FIG. 2, will rest on its associated bolt which in turn will be supported by one or the other of the mounting brackets 42 and 43. This feature will be more readily apparent if the showing of FIG. 2 is viewed from the left or the right so that the illustrated structure would appear as if the plane of the joint between the hub 20 and the cover 21 extended vertically. Thus, the weight of the yoke segments when in expanded positions is shared by the upper and lower mountings so that neither of these is subjected to excessive loading and they need not be oversized to withstand the strain.

The manner of connecting the bolts with the yoke segment lugs by means of nuts removably seated in sockets 50 formed and arranged as hereinbefore described has a further important advantage, readily apparent from inspection of the drawings, which is that it facilitates ready dismounting of the yoke segments without the necessity for pre-removal of the bolts from their supporting brackets or the yoke lugs. Thus, in the event the bolts become bent or otherwise are rendered difficult to remove during service, the yoke segments when in expanded or partially expanded positions may be simply lifted off of the bolts, after removal of the retainer plates 51 if such retainer elements are employed. This is in contrast to constructions heretofore employed wherein the bolts are so supported and connected with the yoke segment lugs that they must be screwed out of or otherwise longitudinally withdrawn from the yoke lugs before the yoke segments can be dismounted.

A further advantageous feature of closure devices embodying the present invention is that with the bolt receiving lugs extending to the sides of the yoke segments in a direction parallel to the axis of the yoke ring, rather than projecting radially outward therefrom, there is no necessity to provide for additional clearance for such projections and installation problems are avoided in locations where space is restricted. Still other advantages of this feature will become apparent from the ensuing description.

In FIGS. 4 and 5 there is illustrated another form of closure device embodying the present invention. As in the previously described construction, this embodiment includes a supporting hub 20, a cover 21, and a separable two-segment yoke ring for clamping those two parts together. In this case, however, the yoke segments 60a and 60b are hingedly mounted on one side of the closure device by means of hinge pins 61 and 62, respectively, which are pivotally supported in openings 63 and 64 in a mounting bracket 65 affixed to the side of hub 20. Pins 61 and 62 are provided at their lower ends, as viewed in FIGS. 4 and 5, with suitable means, such as indicated at 66, to prevent accidental removal of the pins from their mountings. At their upper ends, the pins have eyelet heads 67 and 68, respectively, through which passes a hinge bolt 70 for supporting one end of a hinge arm 71, the other end of which arm is attached to cover 21. Adjacent ends of yoke segments 60a and 60b at the opposite side of the closure device from the hinged mounting are provided with bolt receiving lugs, one of which lugs is shown at 72 in FIG. 4, and extending between these lugs is a bolt 73 supported in a bracket 74 affixed to the side of hub 20. The form and arrangement of these lugs, bolt and bracket may be the same as employed on one side of the embodiment previously discussed, so for a clearer understanding of these features of the device of FIGS. 4 and 5, reference may be had to FIGS. 2 and 3 and the detailed description thereof with the explanation that the parts 72, 73 and 74 generally correspond, respectively, with the parts 45, 40 and 42. Likewise, the flanges on hub 20 and cover 21 and the form of the clamping groove in the inner peripheries of yoke segments 60a and 60b correspond to and operate in the same manner as the flanges and groove illustrated in FIGS. 2 and 3.

From the foregoing, it will be apparent that when the yoke segments 60a and 60b of the device of FIGS. 4 and 5 are drawn together by bolt 73, the flange of cover 21 will be clamped in tight sealing engagement with the flange of hub 20. Then, upon rotation of bolt 73 in the proper direction, the yoke segments will be positively and equally swung apart about hinge pins 61, 62 to expanded positions, thus releasing cover 21 so that it may be swung to an open position about its hinge bolt 70. The cover then will be supported by the hinge bolt, the pins 61 and 62, and bracket 65, and the yoke segments will be supported by the hinge pins 61 and 62 and bracket 65 on one side and by the bolt 73 and bracket 74 on the other side. The reasons for and advantages of providing the bolt receiving lugs on the sides of the yoke segments, as more fully explained elsewhere herein, are also applicable generally to closure devices of the kind illustrated in FIGS. 4 and 5.

Figure 7:
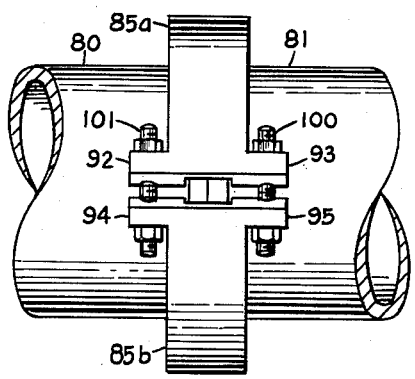
FIG. 7 is a side view of the joint structure of FIG. 6.
Figure 8:
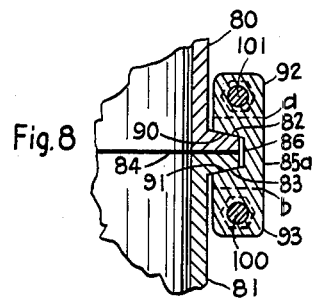
FIG. 8 is a sectional view taken along the line 8—8 of FIG. 6.

In FIGS. 6–8 there is illustrated a modified form of yoke ring which, although suitable for use as a fastening means for closure devices such as hereinbefore described, is shown as employed as a coupling for joining two pipe ends 80 and 81. Each of these pipe ends may comprise a stub end similar in form to the hub 20 of the previously described closure devices and has at one end a circumferentially extending, radially projecting tapered flange as will best be seen from FIG. 8. The back faces of the flanges of pipe elements 80 and 81 are machined to provide frusto-conical contact surfaces 82 and 83, respectively, and a suitable form of gasket, such as indicated at 84, is provided for effecting a seal between the mating surfaces of the flanges. The yoke ring in this embodiment comprises two semi-circular segments 85a and 85b, the internal periphery of each of which has a generally V-shaped groove 86 as indicated in FIG. 8. The side walls of this groove are machined to provide smooth frusto-conical contact surfaces 90 and 91 for engagement respectively with the contact surfaces 82 and 83 on the back walls of the pipe flanges. As in the previously described embodiments, the cooperating contact surfaces, 82 and 90 on the one hand and 83 and 91 on the other hand, extend at the same angle with respect to the plane of the joint between the two pipe ends so that these cooperating contact surfaces substantially coincide with each other when the yoke ring is in its tightened condition for clamping the pipe ends together.

At both of the opposite ends of each of the yoke segments 85a and 85b, there is provided a pair of bolt receiving lugs and, in accordance with the present invention, the lugs of each said pair extend on opposite sides of the associated yoke segment in a direction parallel to the axis of the yoke ring. This will be seen best from FIG. 7 wherein are shown the lugs 92 and 93 on one end of the yoke segment 85a and lugs 94 and 95 on the adjacent end of yoke segment 85b, it being understood that a like arrangement of lugs is provided on the opposite ends of the yoke segments. FIG. 6 shows one of the lugs 96 on the opposite end of segment 85a, and one of the lugs 97 on the opposite end of segment 85b. In the sectional view of FIG. 8, the area between the broken lines a and b may be taken as representing the cross section of the yoke segments at locations other than the ends of the segments where the lugs are provided, whereas the areas above and below the lines a and b, respectively, represent the cross sections of the lugs as viewed in the direction of the arrows on the line 8—8 of FIG. 6. For connecting the yoke segments and drawing them into clamping engagement with the parts to be joined, there are provided four bolts with cooperating nuts, three of which are indicated at 100, 101 and 102 in FIGS. 6 and 7, the fourth bolt and its cooperating nuts being disposed on the reverse of the left hand portion of the yoke ring as viewed in FIG. 6.

From the foregoing description, it will be understood that when the nuts on the four clamping bolts, including the three indicated at 100, 101 and 102 in the drawings, are tightened, mating faces of the flanges on pipe ends 80 and 81 will be clamped together in the manner described in connection with the previous embodiments, and thus, with the aid of a gasket such as indicated at 84, the fluid enclosure comprising the pipe ends and associated piping components (not shown) will be effectively sealed against internal fluid pressure.

In many cases, a high clamping force must be exerted by the yoke ring in order to accomplish such sealing action. This is particularly true in those cases where the enclosure which includes the parts to be joined, such as the pipe ends 80 and 81, is subjected to high internal fluid pressure and is operated at relatively high temperature such that rubber O-rings and similar self-sealing gaskets cannot be safely employed. In such cases it is common practice to employ asbestos ring gaskets or other forms of gaskets which generally are not self-energizing, and under such circumstances the sealing of the joint between the mating faces of the flanges must be accomplished almost entirely by high clamping force exerted by the yoke ring. A similar condition may exist where the parts joined by the yoke ring are subjected to high external loads that may tend to loosen the joint. In such cases, the disposition of the bolt receiving lugs on opposite sides of their associated yoke ring segments, so that they extend in a direction parallel with the axis of the yoke ring in accordance with the present invention, is particularly advantageous. This is for the reason, explained more in detail hereinafter, that with such arrangement of the lugs, bending moments on the ends of the yoke segments in the plane of the yoke are reduced to a minimum or entirely eliminated and the load-deflection characteristic of the yoke cross section is made more uniform around the periphery of the yoke. A further advantage of the construction illustrated in FIGS. 6–8 wherein bolt receiving lugs are disposed on both sides of the ends of the yoke segments, is that a completely balanced load can be applied to the ends of the yoke segments, not only in the plane of the yoke ring but also in planes at 90° to the plane of the yoke, this latter being due to elimination of torsional stresses on the ends of the yoke ring segments. This results in further improvement of the loading characteristics of the yoke ring and also reduces frictional resistance and minimizes galling between the contact surfaces of the yoke and the flanges which are clamped together thereby. Still another advantage of the construction illustrated in FIGS. 6-8 is that it makes possible, when extremely high clamping forces are required, to employ two relatively small bolts for securing together adjacent ends of the yoke ring segments rather than one large bolt. In some cases it may be impractical to employ one bolt of sufficient strength to withstand the required high clamping forces, and in any event, with two bolts the required high forces may be produced with a lower amount of torque applied to the individual bolts.

Certain technical aspects of the present invention now will be explained with reference particularly to the diagrammatic illustrations of FIGS. 9 through 14. This explanation will be applicable in the main to yoke rings employed as fastening means or couplings either for closure devices of the kind exemplified by the illustrations of FIGS. 1-5 or for pipe joints of the kind exemplified by the illustrations of FIGS. 6-8. Accordingly, the part A with its flange $d$ as shown in FIG. 9 may be taken as representative of either a flanged hub such as employed in the embodiments of FIGS. 1-5 or a flanged pipe stub as employed in the embodiment of FIGS. 6-8, while the part B with its flange $e$ may be taken as representative of a second such pipe stub or a cover such as employed in the embodiments of FIGS. 1-5.

Figure 9:
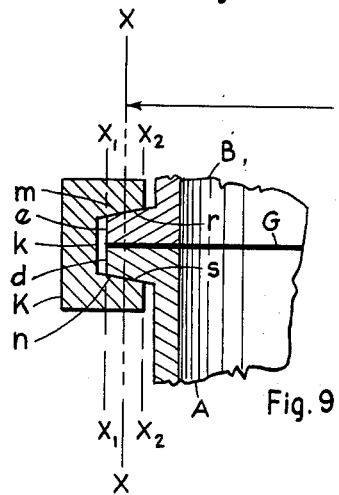
Figure 12:
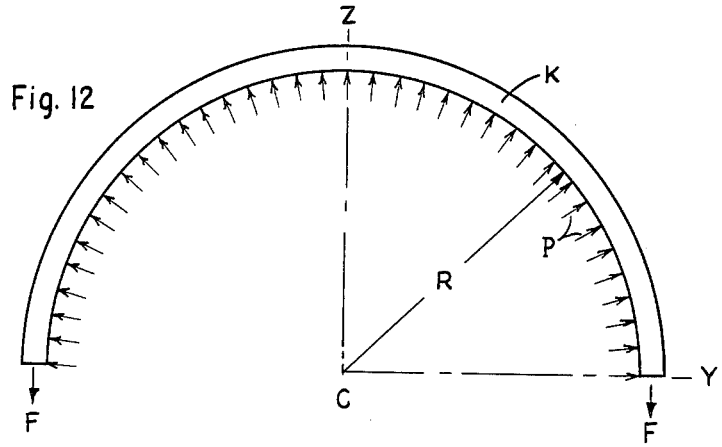

In FIG. 12 there is illustrated in plan view a semi-circular ring segment K corresponding generally to the yoke segments of the previously described embodiments, and having a constant cross-section, diagrammatically illustrated in FIG. 9, with a clamping groove $k$ having inwardly and oppositely flaring side walls $m$ and $n$ of frustoconical form. The plane of this segment, as hereinafter referred to, is indicated by the lines C—Z and C—Y in FIG. 12, and this figure also indicates the conditions for ideal loading of such ring segment. The application of ring tightening forces, by means of yoke bolts as in the previously described embodiments or other securing devices, is represented by the arrows F. The resultant reaction loading on the ring segment is represented by the radial arrows $p$, which are uniformly distributed around the inner periphery of the ring segment and are of equal length, indicating a uniformly distributed reaction loading such that $pR=F$. When a semi-circular ring segment of uniform cross-section throughout its arcuate extent, as illustrated in FIGS. 9 and 12, is subjected to loading conditions as illustrated in FIG. 12, it may be shown by well known principles used in structural stress and strain analysis (as discussed, for example, in "Strength of Materials," Part II, Timoshenko, D. Van Nostrand Co.), that the ring segment is everywhere free of bending moments in the plane of the segment, and its geometric shape therefore will not change with increase in loading. Hence, if the walls $m$ and $n$ of the ring segment groove are originally machined to produce uniform contact with the back faces $r$ and $s$ of the flanges $e$ and $d$ of the parts to be joined, the ring segment will continue to produce such uniform contact when loaded as shown in FIG. 12. This uniformity of contact will result in a uniform transfer of the securing or tightening forces F to the back faces of the flanges and thence to the gasket G (FIG. 9) which is positioned between the mating faces of the flanges.

Such uniform loading of the flanges and interposed gasket is highly desirable since it results in maximum utilization of the forces made available by tightening the yoke bolts or other securing devices. If such uniform loading does not exist, portions of the gasket may be subjected to less than the desired loading upon initial tightening of such securing devices. Then, upon application of internal fluid pressure, which will tend to separate the mating faces of the flanges and remove at least to some degree the loading initially applied to the gasket, that portion of the gasket that was initially lightly loaded will permit fluid leakage at a pressure less than would be the case if the gasket were everywhere initially loaded uniformly to the desired degree. Accordingly, for any given value of initial securing or tightening force, that closure fastening means or coupling which has uniformly loaded yoke ring segments will be capable of withstanding a higher leakage pressure, i.e., pressure at which leakage occurs, than a like fastening means or coupling having non-uniform loading of the ring segments.

A further important reason for desiring to obtain uniform loading of the ring segments is to minimize abrading or "galling" of the back faces of the flanges and the cooperating surfaces of the ring segment grooves. It is well known that when two metal surfaces are brought together under pressure and are then slidably displaced relative to each other (such as would occur, for example, upon loosening of a yoke ring when its associated enclosure is under internal fluid pressure), there is a tendency for one or both of the surfaces to become abraded or galled. By designing and constructing the yoke ring segments so as to obtain uniform loading between the yoke and the associated flanges, thereby eliminating the possibility of high localized loads and attendant high contact pressures, such abrading or galling may be greatly minimized or entirely eliminated.

In order to obtain the ideal loading conditions illustrated in FIG. 12, two requirements must be met: The first of these is that the effective axes of the yoke bolts or other securing devices must be tangent to a cylindrical surface generated by the axial extension of a circular line of contact between the ring segments and the flanges of the parts to be joined, for brevity sometimes referred to hereinafter as the "cylindrical surface of contact." Such a surface, having a radius R and a center line C—C coinciding with the common axis of the ring segment and flanges, is represented by the broken line X—X in FIG. 9. This surface would have a single definite location in cases where the contact surfaces of the ring segment grooves and the flanges are machined to provide circular line contact such as would be provided, for example, by machining either the walls of the grooves or the back faces of the flanges, or both, so as to have a convex contour rather than being machined to provide frusto-conical surfaces of identical form as illustrated. With such last-mentioned surfaces, however, the exact location of the cylindrical surface of contact, represented by the line X—X, may vary between the limits indicated by the broken lines $X_1$—$X_1$ and $X_2$—$X_2$, depending upon the stiffness of the ring segments and the flanges, the magnitude of the imposed loads, the degree of accuracy of machining the contact surfaces, and other conditions. Hence, with contact surfaces of the form illustrated, it will be understood that in actual practice the effective axes of the yoke bolts or other securing devices may be located only approximately tangential to a cylindrical surface of contact since the location of such surface may vary during operation whereas the location of the yoke bolts with respect to the yoke ring segments will, of course, be fixed for any given design. Such location of yoke bolts with their axes tangential, or as close to tangential as practically feasible, to the cylindrical surface of contact prevents application of bending moments to the yoke ring segments in the plane of the segments.

Figure 10:
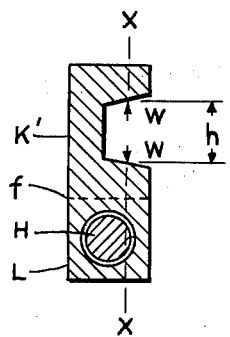

In FIG. 10, there is diagrammatically illustrated the application of the above explained principles to the placement of a bolt receiving lug on a yoke segment which, except at the location of the lug (or lugs, in case they are provided at both ends of the segment), has a cross-section K' like that illustrated in FIG. 9, the remaining portion of the section in FIG. 10, below the broken line $f$, representing a lug L disposed adjacent the end of a ring segment such as illustrated in FIG. 12. It will be noted that the axis of the bolt H which extends through lug L is displaced a short distance toward the outside (the left as viewed in FIG. 10) of the ring segment from a position of optimum tangency to the cylindrical surface of contact represented by the broken line X—X, as often may be required in actual practice in order to meet clearance requirements for bolt heads or nuts and for application of wrenches thereto. However, with allowance for variation in the location of the cylindrical surface of contact between the limits represented by the lines $X_1$—$X_1$ and $X_2$—$X_2$ (FIG. 9) as previously explained, it will be evident that complete or substantially complete prevention of bending moments in the plane of a yoke segment, with the attendant benefits above described, may be attained by location of the bolt receiving lug or lugs so as to extend to the side of the yoke segment in a direction parallel to the axis of the yoke ring, even though the above explained optimum condition of tangency is complied with only approximately.

Figure 11:
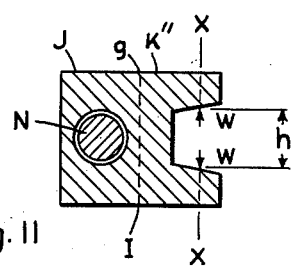
Figure 13:
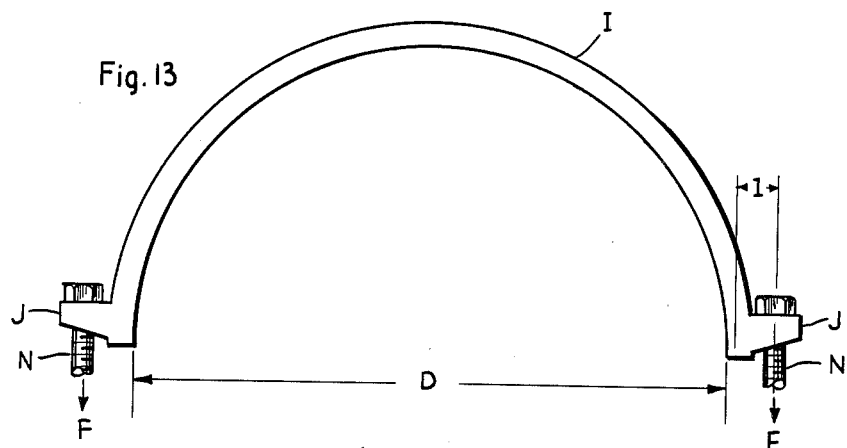
Figure 14:
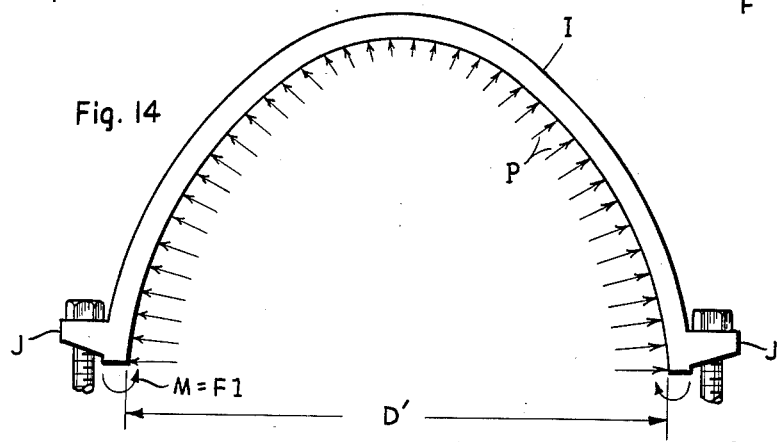

For purposes of contrast, there is diagrammatically illustrated in FIGS. 13 and 14 a semi-circular yoke segment I which is like the ring segment K illustrated in FIG. 12 except that two bolt receiving lugs J are applied respectively at the opposite ends of the segment. FIG. 11 illustrates diagrammatically a cross-section on a radial plane through one of these lugs, and it will be noted that this lug, as does the one on the other end of the yoke segment, projects radially outward, i.e., to the left in FIG. 11, from the base portion K" of the segment as represented by the right of the line g in that figure. When yoke tightening forces F, represented by the arrows in alignment with the axes of the bolts N in FIG. 13, are applied to ring segment I, bending moments M are produced on the ends of the segment as represented by the curved arrows in FIG. 14, and in the directions of those arrows. The magnitude of such moment M is equal to $F \times l$, where F is the bolt force and $l$ is the radial distance between the bolt axis and the hereinbefore referred to circular line of contact between the yoke segment and the flanges engaged thereby. It may be shown by well known principles used in structural stress and strain analysis, such as previously mentioned, that when the yoke segment is subjected to such bending moments, the segment will be deformed from its original semi-circular shape to an approximately elliptical shape as shown (greatly exaggerated for purposes of illustration) in FIG. 14, with a spacing D' between the segment ends which is less than the original diameter D indicated in FIG. 13. This deformation of the yoke segment will result in more forceful contact between the segment and the flanges engaged thereby adjacent the ends of the segment, so that the resultant reaction loading will be non-uniformly distributed around the segment as indicated by the variation in length of the arrows p in FIG. 14. As previously referred to in this discussion, such non-uniform loading may result in fluid leakage between the flanges engaged by the yoke segment upon application of internal pressure to the associated enclosure, and also may lead to abrading or galling of the contact surfaces of the yoke segment and the flanges.

From the foregoing explanation, it will be apparent how the location of bolt lugs on the sides of yoke ring segments (FIG. 10) in accordance with the present invention satisfies one of the two previously mentioned requirements for ideal loading of such segments. Such lug location also satisfies the second requirement, which is that the load-deflection characteristic of the cross-section of a yoke ring segment must be uniform around the periphery of the segment. For purposes of explanation of this aspect, reference is directed particularly to FIGS. 10 and 11, with the understanding that the portion K' above the line f of the section shown in FIG. 10, and the portion K" to the right of the line g in the section shown in FIG. 11, each may be considered in the absence of lug projections as being the equivalent of the section shown in FIG. 9 of a ring segment K having no lugs as represented in FIG. 12. Upon application of ring tightening forces to the ring segment, the resultant forces exerted on the contact surfaces m and n (FIG. 9) of the groove walls by the flanges clamped therebetween as shown in FIG. 9 will cause an increase in the width h (FIGS. 10 and 11) between the contact surfaces by an amount $\Delta h$. If the ring tightening forces F are applied to the ring segment in the manner illustrated in FIG. 12 so that the semi-circular shape of the segment does not change, in accordance with the first requirement previously explained, and if the magnitude of such forces is sufficient to bring the contact surfaces m and n of the ring segment groove into substantial coincidence, respectively, with the contact surfaces r and s on the flanges, then, in the absence of lugs L and J, $\Delta h$ and also the resultant distributed reaction load W (FIGS. 10 and 11) will be substantially uniform so that the load-deflection characteristic $W/\Delta h$ of the ring segment will be uniform throughout its arcuate extent, thereby satisfying the above stated second requirement for ideal loading of the segment.

In practical application of bolt lugs to yoke ring segments, this second requirement may be satisfied by locating a bolt lug on the side of a yoke ring segment so that it extends at 90° to the plane of the segment, or in other words in a direction parallel to the axis of the segment, as represented by the location of lug L in FIG. 10. Such requirement, however, is not satisfied by location of a bolt lug so that it projects radially outwardly from the base portion of the ring segment, such as represented by lug J in FIG. 11, as has been common practice heretofore. In constructions such as illustrated in both FIGS. 10 and 11, the bolt lugs to some degree reenforce the adjacent base portions of the yoke segments against deflections $\Delta h$ when the segments are loaded as above discussed. However, by well known principles used in structural stress and strain analysis, such as previously mentioned, it may be shown that the reinforcement of the yoke segment cross-section by a bolt lug located as shown in FIG. 10 results in only slight change in the load-deflection characteristic of the yoke segment, whereas location of a bolt lug as shown in FIG. 11 produces a major change in the load-deflection characteristic with resultant non-uniformity of that characteristic around the periphery of the segment.

From the foregoing explanation, it will be seen that the provision of bolt lugs which, in accordance with the present invention, extend to the sides of their associated yoke segments in a direction parallel to the axis of the yoke ring, as diagrammatically illustrated in FIG. 10 and also as incorporated in the constructions of the embodiments illustrated in FIGS. 1–8, results in important advantages as hereinbefore described over yoke ring segments having bolt lugs projecting radially outwardly from the segments as represented by the diagrammatic illustration of FIG. 11.

The present invention is not limited to the details of the exemplary embodiments herein described and illustrated, but rather, as will be recognized by those skilled in the art, is subject to modifications and other applications such as, for example, employment in closure fastening devices and couplings comprising more than two yoke ring segments. It is intended therefore that such modifications and other applications as do not depart from the true spirit of the invention shall be included within the scope of the appended claim.

What is claimed and desired to be secured by Letters Patent is:

A closure device comprising
(1) a tubular member having a circumferentially extending, radially projecting flange at one end;
(2) a removable cover member for closing said one end and having a circumferentially extending flange engageable with said first-mentioned flange;
(3) a fastening device for clamping said flanges together when the cover member is in closed position and including a clamping ring comprised of two semi-circular separable segments which are movable relative to each other for expansion and contraction of the clamping ring and
   (a) each of which segments has in its inner periphery an inwardly facing groove with flaring side walls for receiving and clamping together said flanges, (b) each of said segments also having bolt-receiving lugs disposed respectively adjacent its opposite ends and arranged so as to project from one side of the segment in a direction parallel to the axis of the clamping ring and away from said flanged end of said tubular member;

(4) means operable to effect movement of said ring segments relatively toward and away from each other and comprising (a) bolts connected between the adjacent lugs respectively at both ends of said segments, and (b) nuts in threaded engagement with each of said bolts at locations respectively on opposite sides of and spaced outwardly from the midportion of the bolt for engagement with respective ones of said lugs;

(5) and bracket structures fixedly mounted respectively on opposite sides of said tubular member, each of which bracket structures (a) has a bearing portion in which a respective one of said bolts is rotatably mounted for supporting said ring segments when the latter are moved apart out of engagement with said flanges, and (b) is offset from the plane of the joint between said cover and tubular members in said direction parallel to the axis of the clamping ring and away from said flanged end of the tubular member so as to be located outside of the space between adjacent ends of the main clamping portions of said ring segments;

(6) each said ring segment lug having a socket for removably accommodating a respective one of said nuts and the part of the associated bolt upon which it is threaded, (a) which socket of each lug is defined by and between portions of the lug structure which project in spaced relation to each other in a direction away from the main body of the associated ring segment and generally parallel to the axis of the clamping ring, and the remote ends of which projecting lug portions are spaced apart and afford therebetween an access opening facing away from the ring segment in said direction and through which opening said nut and associated bolt part may be inserted into and removed from the socket by relative movement between the ring segment and bolt at right-angles to the axis of the bolt in said direction parallel to the axis of the clamping ring, (b) said socket defining structure also having means operative to restrain a nut therein against removal from the socket in either direction along the longitudinal axis of the associated bolt.

References Cited in the file of this patent

UNITED STATES PATENTS

| | | |
|---|---|---|
| 1,958,923 | Mohler | May 15, 1934 |
| 1,969,120 | Coakley | Aug. 7, 1934 |
| 2,145,613 | Shenk et al. | Jan. 31, 1939 |
| 2,338,622 | Cleveland et al. | Jan. 4, 1944 |
| 2,548,934 | Beaird | Apr. 17, 1951 |
| 2,852,295 | Jasper | Sept. 16, 1958 |
| 2,915,330 | Verbiar | Dec. 1, 1959 |